United States Patent
Gentner et al.

(10) Patent No.: US 10,175,339 B2
(45) Date of Patent: Jan. 8, 2019

(54) DETERMINING A POSITION OF A MOBILE RECEIVER

(71) Applicant: DEUTSCHES ZENTRUM FÜR LUFT-UND RAUMFAHRT E.V., Köln (DE)

(72) Inventors: Christian Gentner, Aalen (DE); Thomas Jost, Germering (DE)

(73) Assignee: Deutsches Zentrum für Luft-und Raumfahrt e.V., Köln (DE)

( * ) Notice: Subject to any disclaimer, the term of this patent is extended or adjusted under 35 U.S.C. 154(b) by 267 days.

(21) Appl. No.: 14/903,146

(22) PCT Filed: Apr. 30, 2014

(86) PCT No.: PCT/DE2014/100151
§ 371 (c)(1),
(2) Date: Apr. 11, 2016

(87) PCT Pub. No.: WO2015/003684
PCT Pub. Date: Jan. 15, 2015

(65) Prior Publication Data
US 2016/0223637 A1    Aug. 4, 2016

(30) Foreign Application Priority Data
Jul. 9, 2013  (DE) .................. 10 2013 107 242

(51) Int. Cl.
*G01S 3/02* (2006.01)
*G01S 5/02* (2010.01)
*H04W 4/02* (2018.01)

(52) U.S. Cl.
CPC .......... *G01S 5/0273* (2013.01); *G01S 5/0278* (2013.01); *H04W 4/02* (2013.01)

(58) Field of Classification Search
CPC ................. G01S 5/0273; H04W 4/025
(Continued)

(56) References Cited

U.S. PATENT DOCUMENTS
2008/0106468 A1    5/2008 Litva et al.

FOREIGN PATENT DOCUMENTS
EP    2570772 A1    3/2013

OTHER PUBLICATIONS
Gentner, Christian, et al., "Indoor positioning using time difference of arrival between multipath components", International Conference on Indoor Positioning and Indoor Navigation, IEEE, Oct. 28, 2013, pp. 1-10.
(Continued)

*Primary Examiner* — Dao L Phan
(74) *Attorney, Agent, or Firm* — Hoffmann & Baron, LLP (57) ABSTRACT

The invention relates to a method and to a mobile receiver for determining a position of a mobile receiver RX, which moves in an unknown but at least quasi-stationary environment, on the basis of signals s(kT) which are emitted by a transmitter TX positioned at an unknown position and immobile in the environment, wherein the receiver RX receives as reception signal $$q(k, \tau) = \sum_{i=0}^{N(k)-1} S_i(\tau)$$

a signal s(kT) which is emitted by the transmitter TX and which is transmitted via N(k) transmission paths as signal components $s_i(\tau)$, where k:=time step, $\tau$:=time delay, and $i=0, \ldots, N(k)-1$, wherein, as interactions: reflections of the signal components $s_i(\tau)$ at reflectors and scatterings of the signal components $s_i(\tau)$ at scatterers are taken into account on the transmission paths, wherein on the basis of the reception signals $q(k,\tau)$ the following are determined: a position $r_u(k)$ and a velocity $v_u(k)$ of the receiver RX, and for
(Continued)

each of the N(k) transmission paths, in each case a position $r_{v,i}(k)$ of a virtual transmitter $vTX_i$, and a transmission path distance $d_{v,i}$ between the transmitter TX and a last scatterer $SCATTER_i$ lying on the i-th transmission path, provided that such a scatterer $SCATTER_i$ is present, wherein: a signal component $s_i(\tau)$ of the signal s(kT) that is transmitted on the i-th transmission path no longer experiences further scattering between the last scatterer $SCATTER_i$ and the receiver RX, and, it is assumed that each signal component $s_i(\tau)$ received by the receiver RX is emitted by an assigned virtual transmitter $vTX_i$ and has reached the receiver RX directly without interaction, and at least the determined position $r_u(k)$ of the receiver RX and/or the velocity $v_u(k)$ of the receiver RX are/is provided and/or output for further evaluations.

22 Claims, 4 Drawing Sheets (58) Field of Classification Search
USPC ...... 342/453, 457, 461, 463–465; 455/456.6, 455/457
See application file for complete search history.

(56) References Cited

OTHER PUBLICATIONS

Froehle, M., et al., "Scatterer and virtual source detection for indoor UWB channels", 2011 IEEE International Conference on Ultra-Wideband (ICUWB); S. 16-20, Sep. 14-16, 2011.
Meissner, P., et al., "UWB positioning with virtual anchors and floor plan information", 2010 7th Workshop on Positioning Navigation and Communication (WPNC), S. 150-156, Mar. 11-12, 2010.
English translation of International Preliminary Report on Patentability issued in International Application No. PCT/DE2014/100151 dated Jan. 21, 2016.

DETERMINING A POSITION OF A MOBILE RECEIVER

CROSS-REFERENCE TO RELATED APPLICATIONS

This application is the U.S. National Phase of, and Applicant claims priority from, International Application No. PCT/DE2014/100151, filed 30 Apr. 2014, and German Patent Application No. DE 10 2013 107 242.9, filed 9 Jul. 2013, both of which are incorporated herein by reference in their entirety.

BACKGROUND

The invention relates to a method and a device for determining a position of a mobile receiver RX which moves in an at least quasi-stationary environment. The determination of the position occurs here on the basis of signals s(t) which are emitted by a transmitter TX positioned immobile in the environment at time t=kT with time steps k and time increment T, wherein the receiver RX receives a signal s(kT) emitted by the transmitter TX, which is transmitted via N(k) transmission paths as signal components $s_i(\tau)$, as reception signal $$q(k, \tau) = \sum_{i=0}^{N(k)-1} s_i(\tau),$$

where k:=time step, $\tau$:=time delay, and i=0, ..., N(k)−1. In other words, a signal s(kT) emitted by the transmitter TX is thus transmitted via multipath propagation to the receiver RX. In multipath transmission, as interactions of the signal, the following are primarily taken into account: reflections of the signal components $s_i(\tau)$ at reflectors and/or scatterings of the signal components $s_i(\tau)$ at scatterers, on the different transmission paths.

Position determination, in addition to communication, is today one of the most important areas in which radio transmission of signals is used. The position determination here occurs by determining the propagation distance of a signal emitted by a transmitter TX with known position to a receiver RX. Under direct (quasi-optic) propagation conditions ("line of sight conditions"), the distance traveled by a signal emitted by a transmitter TX can be determined from the amplitude and the phase or time delay ("delay") of the broadband signal received by the receiver. In order to determine a three-dimensional position of the receiver RX, the distances from at least three different transmitters TX must be determined, where it is assumed that the respective positions of the transmitters $TX_i$ are known, and the transmitters $TX_i$ and the receiver RX are time synchronized. Such positioning methods are used, for example, by base stations for mobile communication, global satellite navigation systems (GNSSs), special ultra-broadband transmitters, or WLAN base stations for "indoor" position detection.

Moreover, it is known that, in the case of a multipath reception of radio signals ("multipath reception"), the accuracy of the position determination is decreased if only a standard method for synchronizing, for example, the so-called "delay lock loop" method, is used for the position determination. Attempts to improve the accuracy of the position determination in multipath reception or the accuracy of the distance determination between transmitter TX and receiver RX are based in general on an estimate of the channel impulse response. Here, a quasi-optic, that is to say straight-line propagation of the partial signal from the transmitter to the receiver is assumed for the signal components $s_i(\tau)$ that arrive first. Examples of these methods can be obtained from the following publications:

F. Antreich, J. Nossek, and W. Utschick, "Maximum Likelihood Delay Estimation in a Navigation Receiver for Aeronautical Applications," Aerospace Science and Technology, vol. 12, no. 3, Pages 256-267, 2008;

B. Krach, P. Robertson, and R. Weigel, "An Efficient Two-Fold Marginalized Bayesian Filter for Multipath Mitigation in GNSS Receivers," EURASIP J. Adv. Sig. Proc., vol. 2010, 2010; and P. Closas, C. Fernández-Predes, and J. A. Fernández-Rubio, "A Bayesian Approach to Multipath Mitigation in GNSS Receivers," vol. 3, no. 4, Pages 695-706, August 2009.

These methods determine in each case the respective transmission distances of the individual signal components $s_i(\tau)$, or they determine the signal components $s_i(\tau)$ that arrive first at the receiver, so as to eliminate the influence of the other signal components $s_i(\tau)$ that arrive later. For the determination of a three-dimensional position of a receiver RX, these methods need at least three, and, if the receiver RX is not synchronized with the transmitters $TX_i$, four different transmitters $TX_i$, which in each case transmit signals to the receiver RX.

For uses in indoor position determination ("indoor positioning") of a receiver RX, a method is known from the publication:

P. Meissner and K. Witrisal, "Multipath-Assisted Single-Anchor Indoor Localization in an Office Environment," in IWSSIP, April 2012, which requires a transmitter with known position and known surrounding geometries (room layout) for the positioning of the receiver RX. In the process, reflected ultra-broadband signals are used for the positioning of the receiver RX, wherein both the room geometry, for example, the position and the orientation of the walls, and the position of the transmitter TX have to be known.

SUMMARY

The problem of the invention is to enable an improved and simpler positioning of a receiver RX.

The invention results from the features of the independent claims. Advantageous refinements and embodiments are subject matters of the dependent claims. Additional features, application possibilities and advantages of the invention result from the following description and from the explanation of embodiment examples of the invention, which are represented in the figures.

A method aspect of the problem is solved by a method of determining a position of a mobile receiver RX which moves in an at least quasi-stationary environment, based on signals s(kT) which are emitted by a transmitter TX positioned immobile in the environment, wherein the receiver RX receives a signal s(kT) emitted by the transmitter TX, which is transmitted via N(k) transmission paths as signal components $s_i(\tau)$, as reception signal $$q(k, \tau) = \sum_{i=0}^{N(k)-1} s_i(\tau),$$

where k:=time step, τ:=time delay, and i=0, ..., N(k)−1. The method takes into account as interactions on the transmission paths: reflections of the signal components $s_i(\tau)$ at reflectors and/or scatterings of the signal components $s_i(\tau)$ at scatterers.

The proposed method is characterized in that, on the basis of the reception signals q(k,τ), the following are determined: a position $r_u(k)$ and a velocity $v_u(k)$ of the receiver RX, and for each of the transmission paths N(k) in each case a position $r_{v,i}(k)$ of a virtual transmitter $vTX_i$ and a transmission path distance $d_{v,i}$ between the transmitter TX and a last scatterer $SCATTER_i$ lying on the i-th transmission path, provided that such a scatterer $SCATTER_i$ is present. Here, it is assumed that a signal component $s_i(\tau)$ of the signal s(kT) that is transmitted on the i-th transmission path no longer experiences further scattering between the last scatterer $SCATTER_i$ and the receiver RX. Moreover, it is assumed, that each signal component $s_i(\tau)$ received by the receiver RX is emitted by an assigned virtual transmitter $vTX_i$ and has reached the receiver RX directly without interaction. Finally, at least the determined position $r_u(k)$ of the receiver RX and/or the velocity $v_u(k)$ of the receiver RX are provided and/or output for further evaluations.

The special feature of the method is that a determination of the (relative) position of the receiver RX occurs without knowledge of the position of the transmitter TX and without knowledge of a surrounding geometry, based only on the signal components $s_i(\tau)$ received by the receiver RX. Thus, the method is to a large extent independent of additional information, as needed in the prior art for position determination. Another special feature of the invention is that, for each signal component $s_i(\tau)$ received by the receiver RX, it is assumed that this signal component is emitted by an assigned virtual transmitter $vTX_i$, and each signal component $s_i(\tau)$ is transmitted directly by assigned virtual transmitters $vTX_i$, i.e., under "line-of-sight conditions," to the receiver RX. The determined positions are at first relative positions.

A refinement of the method is characterized in that, at the start of the process, for the position $r_u(k)$ and/or the velocity $v_u(k)$ of the receiver RX, a start position $r_u(k=0)$ and a start velocity $v_u(k=0)$ or a probability distribution for a start position $r_u(k=0)$ and a start velocity $v_u(k=0)$ are predetermined. This allows the determination of absolute positions in a given coordinate system.

A particularly preferable refinement of the invention is characterized in that a SLAM algorithm ("Simultaneous Localization and Mapping") is used for determining the position $r_u(k)$ and the velocity $v_u(k)$ of the receiver RX, and the positions $r_{v,i}(k)$ of the virtual transmitters $vTX_i$ and the transmission path distances $d_{v,i}$. SLAM algorithms are known to the person skilled in the art, so that reference is made to the prior art for this subject.

A refinement of the invention is characterized in that a state vector X(k) is defined, where:

$$X(k)=[r_u(k)^T, v_u(k)^T, x_{v,0}(k)^T, \ldots, x_{v,N(k)-1}(k)^T]^T, \quad (1)$$

where:
$r_u(k)$: position of the receiver RX at time step k,
$v_u(k)$: velocity vector of the receiver RX at time step k, and
$x_{v,i}(k)=[r_{v,i}(k)^T, d_{v,i}]^T$: state vector of the virtual transmitter $vTX_i$ at time step k, wherein $r_{v,i}(k)^T$ is the position of the transmitter $vTX_i$ and $d_{v,i}$ is a transmission path distance, and a temporal change of the state vector X(k) is represented in the method according to:

$$X(k)=f_k(X(k-1), w(k-1)), \quad (2)$$

where:
$f_k(.,.)$: linear or nonlinear function of X(k−1), and
w(k−1): noise term.

A refinement of the method is characterized here in that the state vector X(k) is defined as above, and a temporal change of the state vector $x_{v,i}(k)$ is represented according to:

$$x_{v,i}(k)=x_{v,i}(k-1)+w_i(k-1), \quad (3)$$

where $w_i(k-1)$:=noise term, and therefore the position of the respective virtual transmitter $vTX_i$ remains approximately the same. The noise term $w_i(k-1)$ typically has only very small values.

A refinement of the method is characterized in that the state vector X(k) is determined by a recursively defined sequential Bayes filter. The use of the recursively defined sequential Bayes filter is also known to the person skilled in the art from the prior art. Such a use is moreover described in the course of the following explanations.

A refinement of the method is characterized in that the following applies to the reception signals q(k,τ):

$$q(k,\tau) = \sum_{i=0}^{N(k)-1} \alpha_i(k) \cdot s(kT - (\|r_u(k) - r_{v,i}(k)\| + d_{v,i})/c) + n_q(k), \quad (4)$$

where:
s(kT): signal transmitted by the transmitter TX at time kT,
q(k,τ): signal received by the receiver RX,
$\alpha_i(k)$: amplitude, and
$n_q(k)$: noise term at time step k.

A refinement of the method is characterized in that a super-resolution algorithm or a SAGE-algorithm algorithm ("space-altering generalized expectation-maximation algorithm") is used in order to estimate a time delay $\tau_i(k)$ of the i-th signal component $s_i(\tau)$ at the receiver RX. For this purpose, reference is made, for example, to the article by Thomas Jost et al., "Detection and tracking of mobile propagation channel paths," Antennas and Propagation, IEEE Transactions on, vol. 60, no. 10, Pages 4875-4883, October 2012.

A refinement of the method is characterized in that the following distance model is used for the i-th signal component $s_i(\tau)$:

$$d_i(k)=\|r_u(k)-r_{v,i}(k)\|+d_{v,i}+n_d(k)=c\tau_i(k), \quad (5)$$

where:
$d_i(k)$: estimated propagation distance of the signal component $s_i(\tau)$,
c: speed of light, and
$n_d(k)$: noise term.

The problem is moreover solved by a computer system, with a data processing device, wherein the data processing device is designed so that a method as described above is carried out on the data processing device.

In addition, the problem is solved by a digital storage medium with control signals that are electronically readable, wherein the control signals can work together with the programmable computer system so that a method as described above is carried out.

Furthermore, the problem is solved by a computer program product with program code—stored on a machine readable support—for carrying out the method as described above when the program code is executed on a data processing device.

Finally, the invention relates to a computer program with program codes for carrying out the method as described above when the program is run on a data processing device. For this purpose, the data processing device can be designed as any computer system known from the prior art.

A device aspect of the problem is solved by a mobile receiver RX which is movable in an at least quasi-stationary environment and which is set up and implemented so as to determine a position of the receiver RX on the basis of signals s(kT) which are emitted by a transmitter TX positioned immobile in the environment, wherein the receiver RX receives a signal s(kT) emitted by the transmitter TX, which is transmitted via N(k) transmission paths as signal components $s_i(\tau)$, as reception signal $$q(k, \tau) = \sum_{i=0}^{N(k)-1} s_i(\tau),$$

where k:=time step, $\tau$:=time delay, and i=0, ..., N(k)−1, wherein, as interactions, reflections of the signal components $s_i(\tau)$ at reflectors and/or scatterings of the signal components $s_i(\tau)$ at scatterers are taken into account on the transmission paths.

The proposed receiver RX comprises an evaluation means, which is designed and set up so that on the basis of the reception signals q(k,$\tau$), a position $r_u(k)$ and a velocity $v_u(k)$ of the receiver RX are determined, and for each of the N(k) transmission paths in each case a position $r_{v,i}(k)$ of a virtual transmitter $vTX_i$ and a transmission path distance $d_{v,i}$ between the transmitter TX and a last scatterer $SCATTER_i$ lying on the i-th transmission path are determined, provided that such a scatterer $SCATTER_i$ is present, wherein: a signal component $s_i(\tau)$ of the signal s(kT) that is transmitted on the i-th transmission path, between the last scatterer $SCATTER_i$ and the receiver RX, no longer experiences further scattering, and for the virtual transmitter $vTX_i$ it is assumed that each signal component $s_i(\tau)$ received by the receiver RX is emitted by an assigned virtual transmitter $vTX_i$ and has reached the receiver RX directly without interaction (reflection and/or scattering). The receiver moreover comprises an output means, by which at least the determined position $r_u(k)$ of the receiver and/or the velocity $v_u(k)$ of the receiver RX can be provided and/or output for additional evaluations.

Additional advantages, features, and details result from the following description, in which—as appropriate in reference to the drawings—at least one example embodiment is described in detail. Identical, similar and/or functionally equivalent parts are provided with identical reference numerals.

DETAILED DESCRIPTION

In the radio transmission of a signal s(kT) from a transmitter TX to a receiver RX, the signal s(kT) is transmitted in a structured environment, for example, in a large city with buildings and other objects, as a plurality of signal components $s_i(\tau)$ to the receiver RX. The different signal components $s_i(\tau)$ are assigned to different transmission paths. The signal components $s_i(\tau)$ are reflected or scattered here at various objects (for example, walls, pylons, etc.) of the environment. This multipath propagation of the signal s(kT) from the transmitter TX to the receiver RX produces constructive and destructive interferences and phase shifts of the signal components $s_i(\tau)$ received at the receiver RX. In general, the channel response CIR ("Channel Impulse Response") acquired by the receiver RX: h(k,$\tau$) is the sum of an infinite number of individual signal components $s_i(\tau)$, which arrive at the receiver RX from the transmitter TX via an infinite number of different signal paths. However, the receiver RX is only capable of acquiring signal components $s_i(\tau)$ whose signal output is greater than a sensitivity limit value of the receiver RX.

The time-dependent channel impulse response CIR h(k,$\tau$) can be defined as follows:

$$h(k, \tau) = \sum_{i=0}^{N(k)-1} \alpha_i(k) \cdot \delta(\tau - \tau_i(k)), \quad (6)$$

where:
k: discrete time step,
$\tau$: time delay,
N(k): number of multipath components, or number of multipaths,
$\alpha_i(k)$: complex amplitude of the i-th signal component $s_i$,
$\tau_i(k)$: time delay of the i-th signal component $s_i$, and
$\delta(k)$: Dirac distribution.

The signals $s_i(\tau)$ received by the receiver RX are bandwidth limited and therefore sampled at a resolution of 1/B, where B is the bandwidth. The signal amplitude of a sample is therefore the sum of the individual received signal components $s_i(\tau)$. In addition, the received signals $s_i(\tau)$ are influenced by a receiver noise.

So-called "super resolution" algorithms are known such as, for example, the "space-alternating generalized expectation-maximation (SAGE)" algorithm which allows the estimation of parameters of the channel impulse response CIR h($k_0$, $\tau$) at the given time $k_0$.

Figure 1A:
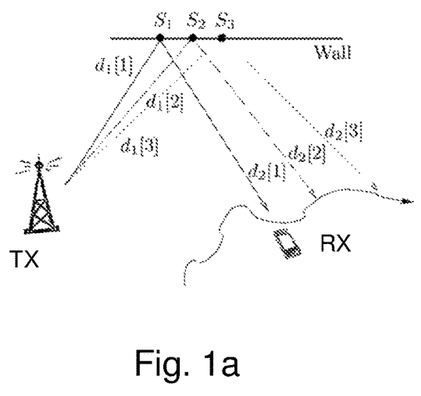
FIG. 1a shows an example of a signal transmission between transmitter TX and receiver RX with signal reflection.
Figure 1B:
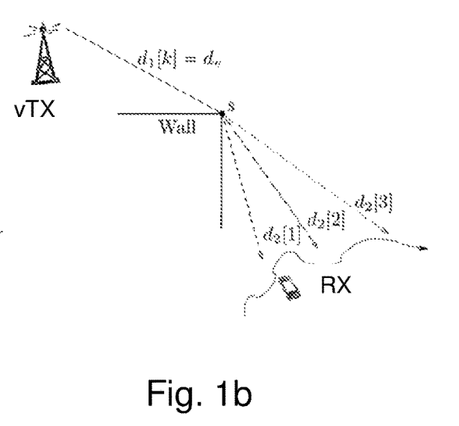
FIG. 1b shows an example of a signal transmission between transmitter TX and receiver RX with signal scattering.

As signal interactions on the transmission paths, the present method takes into account reflections at reflecting objects and the scattering at scattering objects. For this purpose, FIGS. 1a and 1b show scenarios for a signal transmission from a stationary transmitter TX to a moving receiver RX. FIG. 1a shows a scenario in which a signal emitted by the transmitter TX is reflected by a wall Wall. FIG. 1b shows a scenario in which a signal emitted by the transmitter TX is scattered at a scatterer, for example, a wall edge. When the receiver RX moves, then, in FIG. 1a, the reflection point $S_k$, k=1, ..., 3, on the wall also migrates. The total distance traveled by the signal s(kT) from the transmitter TX to the receiver RX is obtained here as the sum of a first component $d_1(k)$, which indicates the distance between the transmitter TX and the reflection point $S_k$, and a second component $d_2(k)$, which indicates the distance from the respective reflection point $S_k$ to the receiver RX. At each reflection point $S_k$, the angle between the wall Wall and the first component $d_1(k)$ and the second component $d_2(k)$ is equal, which produces a corresponding movement of the reflection points $S_k$.

FIG. 1b shows the scenario in which the signal s(kT) emitted by the transmitter TX is scattered at a scatterer SCATTER, e.g., edge of wall Wall. Here too, the total distance d(k) of the transmission path is composed of a first and a second component $d(k)=d_1(k)+d_2(k)$, wherein k indicates the time sample k=1, 2, 3. When the receiver RX moves, the total distance d(k) of the transmission path of the signal s(kT) changes in this case. Nevertheless, in the case of scattering, the (signal) distance between transmitter TX and scatterer SCATTER remains constant, i.e., $d_1(k)=d_v$.

Above, two interactions of a transmitted signal s(kT) in a multipath transmission were explained: reflection and scattering. Now, it is explained how the signal components $s_i(\tau)$ transmitted on different transmission paths can be used for the determination of the position of the receiver RX. Here, it is presently proposed that each signal component $s_i(\tau)$ acquired by the receiver RX should be considered to be a signal $s_i(\tau)$ emitted by a virtual transmitter $vTX_i$ and transmitted to the receiver RX quasi-optically, that is, without interaction with the environment under line-of-sight conditions. Analogously to the actual transmitter TX, in which, in the case of a quasi-optic propagation (line-of-sight), a signal travels the distance to the receiver RX in the time $\tau_i(k)$, the signal component $s_i(\tau)$ travels from the virtual transmitter $vTX_i$ in the time $\tau_i(k)$, as indicated in equation (6). Therefore, it is presently assumed that the virtual transmitter $vTX_i$ is arranged immobile and time synchronized with the actual transmitter TX, i.e., a signal $s_i(\tau)$ is emitted in the underlying model at the same time at the actual transmitter TX and at the virtual transmitter $vTX_i$.

Figure 2:
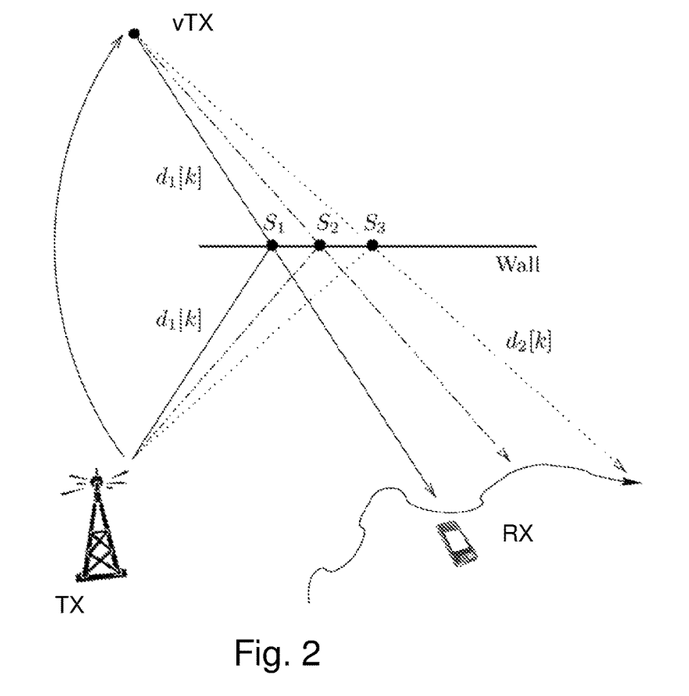
FIG. 2 shows an example of a signal transmission between transmitter TX and receiver RX with simple signal reflection as an explanation of the method.

On this subject, FIG. 2 shows the same scenario as FIG. 1a, in which the signal s(kT) emitted by the actual transmitter TX is reflected on a wall Wall. In order to determine the position of the virtual transmitter vTX, the position of the actual transmitter TX is mirrored on the wall Wall. When the receiver RX is moving, the reflection point ($S_1$, $S_2$, $S_3$) moves in the same way, wherein the position of the virtual transmitter vTX remains the same. The distance d(k) between the virtual transmitter vTX and the receiver RX for each time step k is in each case identical to the distance between the actual transmitter TX and the receiver RX: $d(k)=d_1(k)+d_2(k)$.

Figure 3:
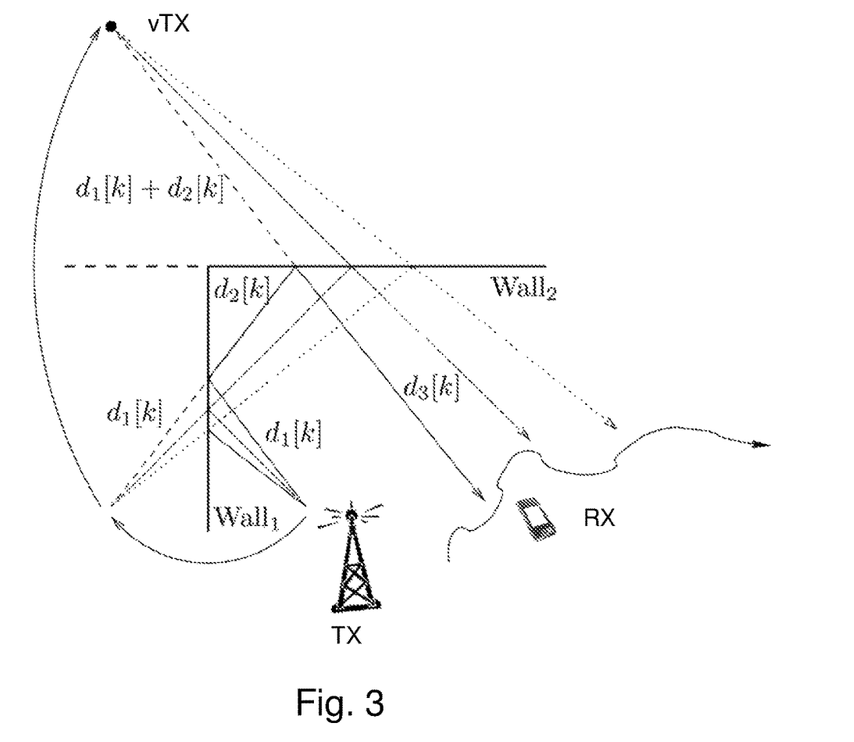
FIG. 3 shows an example of a signal transmission between transmitter TX and receiver RX with multiple signal reflection as an explanation of the method.

A scenario in which a signal s(kT) emitted by the transmitter TX is multiply reflected is shown in FIG. 3. The signal s(kT) emitted by the transmitter TX is reflected twice, once at a first wall $Wall_1$ and once at a second wall $Wall_2$. The distance d(k) between the virtual transmitter vTX and the receiver RX is identical to the distance d(k) between the actual transmitter TX and the receiver RX: $d(k)=d_1(k)+d_2(k)+d_3(k)$ at time step k.

Figure 4:
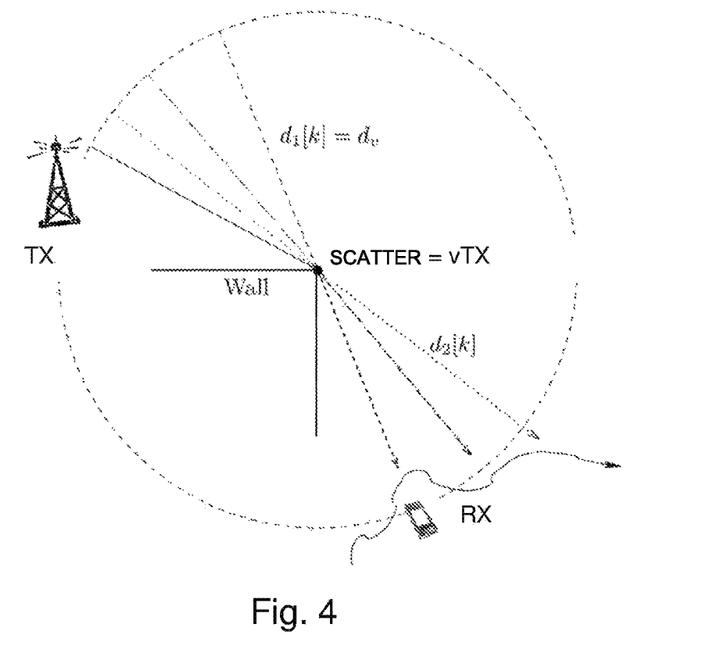
FIG. 4 shows an example of a signal transmission between transmitter TX and receiver RX with scattering as an explanation of the method.

FIG. 4 explains the same scenario as FIG. 1b, in which the signal s(kT) is scattered at a SCATTER, e.g., edge of wall Wall. In contrast to the above-explained reflection case, in the case of a moving receiver RX, in the present scattering case, the position of the virtual transmitter vTX is not constant but dependent on the time: $\tau_i(k)$, since the scatterer SCATTER (presently the wall edge) is stationary. However, one can easily see that the possible positions of the virtual transmitter vTX lie on a circle with a radius $d_v$, whose center is the position of the scatterer SCATTER, wherein $d_v$ is the distance between the transmitter TX and the scatterer SCATTER. Here, one can define the center of the circle as virtual transmitter $vTX_i$, and treat the distance $d_v$ as an additional transmission distance of the signal component s(kT). The total distance d(k) of the signal is thus: $d(k)=d_1(k)+d_2(k)=d_v+d_2(k)$ for time k and distance $d_v$.

Figure 5:
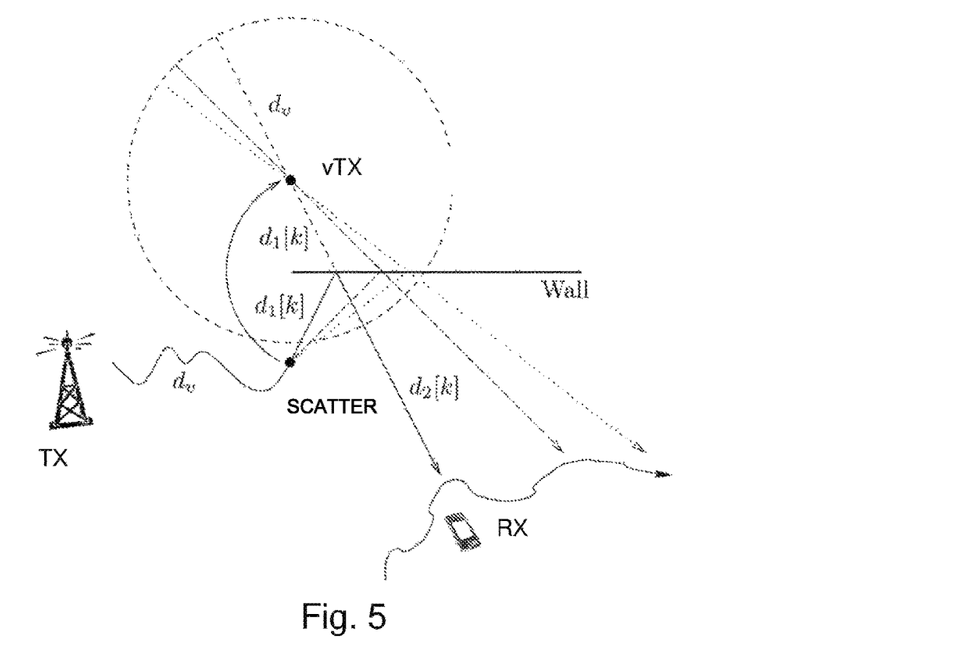
FIG. 5 shows an example of a signal transmission between transmitter TX and receiver RX with scattering and reflection as an explanation of the method.

FIG. 5 shows a generalization of the interactions of the transmitted signal s(kT) in the case of multipath propagation. Here, the signal s(kT) emitted by the transmitter TX is scattered at the scatterer SCATTER and subsequently reflected on the wall Wall. Between the transmitter TX and the scatterer SCATTER, other interactions of the signal s(kT) (reflection/scatterings) at objects of an environment are possible. In order to determine the position of the virtual transmitter vTX, the scatterer SCATTER is mirrored on the wall Wall. Then, the position of the virtual transmitter vTX is identical to the center of a circle of radius $d_v$, wherein $d_v$ is the distance between the transmitter TX and the scatterer SCATTER. This results in the total transmission distance of $d(k)=d_1(k)+d_2(k)+d_v$ for time k and constant distance $d_v$. The last scattering of the signal s(kT) on the transmission path or its mirroring also defines the position of the virtual transmitter vTX or the center of the above-mentioned circle.

In order to use the information of all the multipath components $s_i(\tau)$, the proposed method has to estimate the positions of N(k) virtual transmitters $vTX_i$ on the basis of the N(k) signal components $s_i(\tau)$ received by the receiver RX. A method for estimating the position of the receiver RX and simultaneously estimating landmarks of an environment is the so-called SLAM algorithm ("Simultaneous Localization and Mapping"). Presently, the SLAM algorithm—as also the entire method—is carried out in the receiver RX, wherein thereby the position of the receiver RX and the positions of the virtual transmitters $vTX_i$ are estimated as landmarks. Here, a non-stationary scenario is assumed, in which the receiver RX moves in a stationary (or at least quasi-stationary) environment. Due to the non-stationary condition, a tracking filter can be used in order to obtain recursive estimates of the position of the receiver RX as well as of the virtual transmitters $vTX_i$. For this purpose, sequential Bayes filters are known. Sequential Bayes filters estimate an unknown probability density function (pdf) recursively over time using measurement data and a mathematical process model, see, for example, article by M. Arulampalam et al., "A tutorial on particle filters for inline nonlinear/non-gaussian bayesian tracking," Signal Processing, IEEE Transactions, vol. 50, no. 2, Pages 174-188, February 2002.

Using a sequential Bayes filter, a state vector X(k) at time k can thus be determined, wherein measurement data z[1:k] where {z(i), i=1, ..., k} up to the time step k are used and the probability density function pdf: p(X(k)|z[1:k−1]) is determined. The sequential Bayes filter comprises essentially two steps, a prediction step and an update step. The probability density function of the prediction step is the integral of the products of the probability distribution pdf of the transition from time step k−1 to time step k and of the last estimate of the pdf at time step k−1, i.e.:

$$p(X(k)|z[1:k-1]) = \int p(X(k)|X(k-1))p(X(k-1)|z[1:k-1]) \, dX(k-1). \quad (7)$$

For the update step, the probability distribution is obtained from the Bayes rule, provided that the measurement of the state z(k) at time k is known:

$$p(X(k)|z[1:k]) = \frac{p(z(k)|X(k))p(X(k)|z[1:k-1])}{p(z(k)|z[1:k-1])}. \quad (8)$$

The system model which defines the transition probability distribution p(X(k)|z[1:k−1]) in the sequential Bayes filter describes the change of the state vector X(k) at the time k−1 on the time step k:

$$X(k)=f_k(X(k-1),w(k-1)), \quad (2)$$

wherein $f_k(.,.)$ is a linear or nonlinear function and the term w(k) is a noise term.

The measurement model of the sequential Bayes filter relates the state vector X(k) to the measurements at time step k as follows:

$$z(k)=h_k(X(k),n(k)), \quad (9)$$

wherein $h_k(.,.)$ is a linear or nonlinear function and n(k) is a noise term.

In the proposed method, a SLAM algorithm preferably estimates the position of the receiver RX, the positions of the virtual transmitters $vTX_i$, where i=1, ..., N(k), and possibly the distance $d_v$. Thus, the state vector X(k) at time step k for N(k) multipath signal components $s_i(\tau)$ is defined as follows:

$$X(k)=[r_u(k)^T, v_u(k)^T, x_{v,0}(k)^T, \ldots, x_{v,N(k)-1}(k)^T]^T, \quad (1)$$

where:
$r_u(k)$: position vector of the receiver,
$v_u(k)$: velocity vector of the receiver, and
$x_{v,i}(k)$: $x_{v,i}(k)]=[r_{v,i}(k)^T, d_{v,i}]^T$, state vector of the virtual transmitter $vTX_i$ where $r_{v,i}(k)$: position vector of the virtual transmitter $vTX_i$ and $d_{v,i}$: additional distance for the signal component i=0, ..., N(k)−1.

The algorithm determines the position of the virtual transmitters $vTX_i$ as the center of a circle with center coordinates $r_{v,i}(k)$ and radius $d_{v,i}$ in the case where scattering occurs on the i-th transmission path. If no scattering occurs on the i-th transmission path, i.e., the signal component $s_i(\tau)$ is only reflected, the algorithm will estimate the radius $d_{v,i}=0$.

Moreover, since the reflecting objects are assumed to be immobile in the environment, the state model at time step k for each virtual transmitter $vTX_i$, where i=0, ..., N(k)−1, is preferably selected as follows:

$$X_{v,i}(k)=x_{v,i}(k-1)+w_i(k-1), \quad (3)$$

wherein $w_i(k-1)$ is a noise term. For the system model for describing the receiver position $r_u(k)$ and the velocity $v_u(k)$, a known prediction model can be used, such as, for example, the model described by B. W. Parkinson and J. J. Spilker Jr., "Global Positioning System: Theory and Applications," Vol. 1, American Institute of Aeronautics and Astronautics Inc., 1996, or M. Khider, S. Kaiser, P. Robertson: "A Novel 3-Dimensional Movement Model for Pedestrian Navigation," RIN Journal of Navigation 2012, 65(2): Pages 245-264.

Two strategies can be used to integrate the measurement results q(k,τ) received by the receiver RX. On the one hand, the measurement results q(k,τ) (sampled reception signals) can be used directly or a two-step method can be used.

The first strategy provides that the sampled reception signals q(k,τ) are used directly, wherein the following is applicable:

$$q(k,\tau) = \sum_{i=0}^{N(k)-1} \alpha_i(k) \cdot s(kT - (\|r_u(k) - r_{v,i}(k)\| + d_{v,i})/c) + n_q(k), \quad (4)$$

where
s(kT): signal transmitted by the transmitter at time kT,
q(k, τ): signal received by the receiver,
$\alpha_i(k)$: amplitude,
$n_q(k)$: noise term at time step k, and
c: speed of light.
In general, $\alpha_i(k)$ can also depend on the distance.

The second strategy uses a so-called "super resolution" algorithm such as, for example, a SAGE-based Kalman filter algorithm as described in the article by Thomas Jost et al., "Detection and tracking of mobile propagation channel paths" in Antennas and Propagation, IEEE Transactions on, Vol. 60, No. 10, Pages 4875-4883, 2012. This algorithm estimates the time delay $\tau_i(k)$ of the i-th signal component $s_i(\tau)$ in accordance with equation (6). The propagation distance of the i-th signal component $s_i(\tau)$ at time k accordingly is: $d_i(k)=c\cdot\tau_i(k)$, wherein c is the speed of light. Thus, the measurement model for the i-th multipath component $s_i(\tau)$ can be defined as follows:

$$d_i(k)=\|r_u(k)-r_{v,i}(k)\|+d_{v,i}+n_d(k), \quad (5)$$

wherein $n_d(k)$ is a noise term and $d_i(k)$ is the estimated total distance to the receiver RX of a signal $s_i$ that was emitted by the i-th virtual transmitter $vTX_i$.

The described method can be used in a plurality of other scenarios. For example, instead of the position of a reflector or of a scatterer, the source of a "Signals of Opportunity" (SoO) or of another network node can be determined. In these cases, the signal sources are in each case treated as virtual transmitters $vTX_i$. Below, several example applications are listed.

Signal Transmission by a Relay Station

A relay amplifies received signals and forwards them, for example, in a network, to other nodes. In a simple scenario, signals received by a base station are amplified by a relay and further transmitted to a mobile receiver unit. The signal transmission between the base station and the relay here occurs as a direct wave, i.e., in so-called "line-of-sight" transmission. In application of the proposed method, the mobile receiver treats the relay as a virtual transmitter vTX and estimates the distance between the base station and the relay as $d_v$. The receiver uses a SLAM algorithm for estimating its own position and the position of the relay.

Round-Trip Delay Measurement and Cooperative Position Determination

The round-trip delay (RTD—Round Trip Delay time) is the time needed for a signal to travel from a transceiver TX/RX to a specific partner and back to the transceiver TX/RX. Round-trip delay measurements are used, among other purposes, for cooperative positioning, on this subject see also, for example: J. E. Staudinger and S. Sand, "Generic real-time round-trip-delay test-bed for cooperative positioning," in Positioning Navigation and Communication (WPNC), 2012, 9th Workshop on, March 2012, pages 94-99. If the position of the partner is unknown, the proposed method executed in the transceiver treats the partner as virtual transmitter vTX. In addition, signals between several partners can be used in order to estimate distances between the partners. The transceiver uses a SLAM algorithm for the estimation of its own position and of the position of the partner.

Signals of Opportunity (SoO)

A mobile unit here receives a SoO that was emitted by a transmitter with unknown position and with unknown time offset with respect to a system time of the mobile unit. On this subject see also: J. A. Dammann, S. Sand, and R. Raulefs, "Signals of opportunity in mobile radio positioning," in Signal Processing Conference (EUSIPCO), 2012 Proceedings of the 20th European, August 2012, pages 549-553. In application of the proposed method, the mobile receiver treats the transmitter as virtual transmitter vTX and estimates the time offset as $d_v$. The receiver uses a SLAM algorithm for estimating its own position and the position of the transmitter of the SoO.

Although the invention has been further illustrated and explained in detail using preferred example embodiments, the invention is nonetheless not limited to the disclosed examples, and other variations can be derived therefrom by the person skilled in the art without leaving the scope of protection of the invention. It is therefore clear that a plurality of variation possibilities exist. It is also clear that the embodiments mentioned as examples really represent only examples that in no way should be considered limitations of, for example, the scope of protection, the application possibilities or the configuration of the invention. Instead, the preceding description and the description of the figures enable the person skilled in the art to convert the embodiments given as examples concretely, wherein the person skilled in the art, in the knowledge of the disclosed invention idea, can proceed to carry out a variety of modifications, for example, pertaining to the function or the arrangement, in an embodiment of a mentioned element that was given as an example, without leaving the scope of protection which is defined by the claims and their legal equivalents such as, for example, further explanations in the description.

The invention claimed is:

1. A method for determining the position of a mobile receiver RX, which moves in an unknown but at least quasi-stationary environment, on the basis of signals $s(\tau)$ which are emitted by a transmitter TX positioned at an unknown position and immobile in the environment, wherein the receiver RX receives a signal $s(\tau)$ emitted by the transmitter TX, which is transmitted via N(k) transmission paths as signal components $s_i(\tau)$, as reception signal $$q(k, \tau) = \sum_{i=0}^{N(k)-1} s_i(\tau),$$

where k:=time step, $\tau$:=time delay, and i=0, ..., N(k)-1, wherein, as interactions: reflections of the signal components $s_i(\tau)$ at reflectors and scatterings of the signal components $s_i(\tau)$ at scatterers are taken into account on the transmission paths, the method comprising:

determining, on the basis of the reception signals $q(k,\tau)$ a position $r_u(k)$ and a velocity $v_u(k)$ of the receiver RX, and for each of the N(k) transmission paths in each case a position $r_{v,i}(k)$ of a virtual transmitter $vTX_i$, and a transmission path distance $d_{v,i}$ between the transmitter TX and a last scatterer $SCATTER_i$ lying on the i-th transmission path, provided that such a scatterer $SCATTER_i$ is present, wherein:

a signal component $s_i(\tau)$ of the signal $s(kT)$ that is transmitted on the i-th transmission path no longer experiences further scattering between the last scatterer $SCATTER_i$ and the receiver RX, and, for the virtual transmitters $vTX_i$, it is assumed that each signal component $s_i(\tau)$ received by the receiver RX is emitted by an assigned virtual transmitter $vTX_i$ and has reached the receiver RX directly without interaction; and providing or outputting at least the determined position $r_u(k)$ of the receiver RX and/or the velocity $v_u(k)$ of the receiver RX for further evaluations.

2. The method according to claim 1, wherein the method further comprises using a simultaneous localization and mapping (SLAM) algorithm to determine the position $r_u(k)$ and the velocity $v_u(k)$ of the receiver RX, and the positions $r_{v,i}(k)$ of the virtual transmitters $vTX_i$ and the transmission path distances $d_{v,i}$.

3. The method according to claim 1, wherein the method further comprises:

defining a state vector X(k) where:

$$X(k)=[r_u(k)^T, v_u(k)^T, x_{v,0}(k)^T, \ldots, x_{v,N(k)-1}(k)^T]^T, \quad (1)$$

where:

$r_u(k)$: position of the receiver RX at time step k, $v_u(k)$: velocity vector of the receiver RX at time step k, and $x_{v,i}(k)=[r_{v,i}(k)^T, d_{v,i}]^T$: state vector of the virtual transmitter $vTX_i$ at time step k, wherein $r_{v,i}(k)^T$ is the position of the transmitter $vTX_i$ and $d_{v,i}$ is the transmission path distance; and representing a temporal change of the state vector X(k) according to:

$$X(k)=f_k(X(k-1), w(k-1)), \quad (2)$$

where:

$f_k$: linear or nonlinear function of X(k-1), and w(k-1): noise term.

4. The method according to claim 1, wherein the method further comprises:

defining a state vector X(k) where:

$$X(k)=[r_u(k)^T, v_u(k)^T, x_{v,0}(k)^T, \ldots, x_{v,N(k)-1}(k)^T]^T, \quad (1)$$

where:

$r_u(k)$: position of the receiver RX at time step k:

$v_u(k)$: velocity vector of the receiver RX at time step k, and $x_{v,i}(k)=[r_{v,i}(k)^T, d_{v,i}]^T$: state vector of the virtual transmitter $vTX_i$ at time step k, wherein $r_{v,i}(k)^T$ is the position of the transmitter $vTX_i$ and $d_{v,i}$ is the transmission path distance; and representing a temporal change of the state vector $x_{v,i}(k)$ according to:

$$X_{v,i}(k)=x_{v,i}(k-1)+w_i(k-1), \quad (3)$$

where:

$w_i(k-1)$: noise term, and therefore the position of the respective virtual transmitter remains approximately the same.

5. The method according to claim 3, wherein the method further comprises determining the state vector X(k) by a recursively defined sequential Bayes filter.

6. The method according to claim 1, wherein the method further comprises:

applying the following for the reception signals $q(k,\tau)$:

$$q(k, \tau) = \sum_{i=0}^{N(k)-1} \alpha_i(k) \cdot s(kT - (\|r_u(k) - r_{v,i}(k)\| + d_{v,i})/c) + n_q(k), \quad (4)$$

where:
s(kT): signal transmitted by the transmitter TX at time kT,
q(k,τ): signal received by the receiver RX,
$\alpha_i(k)$: amplitude, and
$n_q(k)$: noise term at time step k.

7. The method according to claim 1, wherein the method further comprises using a super resolution algorithm in order to estimate a time delay $\tau_i(k)$ of the i-th signal component $s_i(\tau)$ at the receiver RX.

8. The method according to claim 1, wherein the method further comprises:
using the following distance model for the i-th signal component $s_i(\tau)$:

$$d_i(k) = \|r_u(k) - r_{v,i}(k)\| + d_{v,i} + n_d(k) = c\tau_i(k), \quad (5)$$

where
$d_i(k)$: estimated propagation distance of the signal component $s_i(\tau)$ from the virtual transmitter vTx$_i$,
c: speed of light, and
$n_d(k)$: noise term.

9. The method according to claim 1, wherein the method further comprises predetermining, at the beginning of the process, for the position $r_u(k)$ and the velocity $v_u(k)$ of the receiver RX, a start position $r_u(k=0)$ and a start velocity $v_u(k=0)$.

10. A mobile receiver RX, which is movable in an unknown but at least quasi-stationary environment and set up and designed for determining a position of the receiver RX on the basis of signals s(kT) which are emitted by a transmitter TX positioned at an unknown position and immobile in the environment, wherein the receiver RX receives a signal s(kT) emitted by the transmitter TX, which is transmitted via N(k) transmission paths as signal components $s_i(\tau)$, as reception signal $$q(k,\tau) = \sum_{i=0}^{N(k)-1} s_i(\tau),$$

where k: time step, τ=time delay, and i=0, ..., N(k)−1, wherein, as interactions, reflections of the signal components $s_i(\tau)$ at reflectors and scatterings of the signal components $s_i(\tau)$ at scatterers are taken into account on the transmission paths, the mobile receiver comprising:
an evaluation means designed and set up so that on the basis of the reception signals q(k,τ) the following are determined: a position $r_u(k)$ and a velocity $v_u(k)$ of the receiver RX, and for each of the N(k) transmission paths in each case: a position $r_{v,i}(k)$ of a virtual transmitter vTX$_i$, and a transmission path distance $d_{v,i}$ between the transmitter TX and a last scatterer SCATTER$_i$ lying on the i-th transmission path, provided that such a scatterer SCATTER$_i$ is present, wherein:
a signal component $s_i(\tau)$ of the signal s(kT) that is transmitted on the i-th transmission path no longer experiences further scattering between the last scatterer SCATTER$_i$ and the receiver RX, and,
for the virtual transmitters vTX$_i$, it is assumed that each of the signal components $s_i(\tau)$ received by the receiver RX is emitted by an assigned virtual transmitter vTX$_i$ and has reached the receiver RX directly without interaction; and
an output means to provide and/or output at least the determined position $r_u(k)$ of the receiver RX and/or the velocity $v_u(k)$ of the receiver RX for additional evaluations.

11. The mobile receiver according to claim 10, wherein the evaluation means uses a simultaneous localization and mapping (SLAM) algorithm to determine the position $r_u(k)$ and the velocity $v_u(k)$ of the receiver RX, and the positions $r_{v,i}(k)$ of the virtual transmitters vTX$_i$ and the transmission path distances $d_{v,i}$.

12. The mobile receiver according to claim 10, wherein the evaluation means is further designed and set up to:
define a state vector X(k) where:

$$X(k) = [r_u(k)^T, v_u(k)^T, x_{v,0}(k)^T, \ldots, x_{v,N(k)-1}(k)^T]^T, \quad (1)$$

where:
$r_u(k)$: position of the receiver RX at time step k,
$v_u(k)$: velocity vector of the receiver RX at time step k, and
$x_{v,i}(k) = [r_{v,i}(k)^T, d_{v,i}]^T$: state vector of the virtual transmitter vTX$_i$ at time step k, wherein $r_{v,i}(k)^T$ is the position of the transmitter vTX$_i$ and $d_{v,i}$ is the transmission path distance; and
represent a temporal change of the state vector X(k) according to:

$$X(k) = f_k(X(k-1), w(k-1)), \quad (2)$$

where:
$f_k$: linear or nonlinear function of X(k−1), and
w(k−1): noise term.

13. The mobile receiver according to claim 12, wherein the state vector X(k) is determined by a recursively defined sequential Bayes filter.

14. The mobile receiver according to claim 10, wherein the evaluation means is further designed and set up to:
define a state vector X(k) where:

$$X(k) = [r_u(k)^T, v_u(k)^T, x_{v,0}(k)^T, \ldots, x_{v,N(k)-1}(k)^T]^T, \quad (1)$$

where:
$r_u(k)$: position of the receiver RX at time step k,
$v_u(k)$: velocity vector of the receiver RX at time step k, and
$x_{v,i}(k) = [r_{v,i}(k)^T, d_{v,i}]^T$: state vector of the virtual transmitter vTX$_i$ at time step k, wherein $r_{v,i}(k)^T$ is the position of the transmitter vTX$_i$ and $d_{v,i}$ is the transmission path distance; and
represent a temporal change of the state vector $x_{v,i}(k)$ according to:

$$X_{v,i}(k) = x_{v,i}(k-1) + w_i(k-1), \quad (3)$$

where:
$w_i(k-1)$: noise term, and therefore the position of the respective virtual transmitter remains approximately the same.

15. The mobile receiver according to claim 14, wherein the state vector X(k) is determined by a recursively defined sequential Bayes filter.

16. The mobile receiver according to claim 10, wherein the evaluation means is further designed and set up to:
apply the following for the reception signals q(k,τ):

$$q(k,\tau) = \sum_{i=0}^{N(k)-1} \alpha_i(k) \cdot s(kT - (\|r_u(k) - r_{v,i}(k)\| + d_{v,i})/c) + n_q(k), \quad (4)$$

where:
s(kT): signal transmitted by the transmitter TX at time kT,
q(k,τ): signal received by the receiver RX,
$\alpha_i(k)$: amplitude, and
$n_q(k)$: noise term at time step k.

17. The mobile receiver according to claim 10, wherein the evaluation means is further designed and set up to use a super resolution algorithm in order to estimate a time delay $\tau_i(k)$ of the i-th signal component $s_i(\tau)$ at the receiver RX.

18. The mobile receiver according to claim 10, wherein the evaluation means is further designed and set up to:
use the following distance model for the i-th signal component $s_i(\tau)$:

$$d_i(k)=\|r_u(k)-r_{v,i}(k)\|+d_{v,i}+n_d(k)=c\tau_i(k), \tag{5}$$

where $d_i(k)$: estimated propagation distance of the signal component $s_i(\tau)$ from the virtual transmitter $vTx_i$, c: speed of light, and $n_d(k)$: noise term.

19. The mobile receiver according to claim 10, wherein the evaluation means is further designed and set up to predetermine, at the beginning of the process, for the position $r_u(k)$ and the velocity $v_u(k)$ of the receiver RX, a start position $r_u(k=0)$ and a start velocity $v_u(k=0)$.

20. The mobile receiver according to claim 10, wherein the evaluation means is further designed and set up to predetermine, at the beginning of the process, for the position $r_u(k)$ and the velocity $v_u(k)$ of the receiver RX, a probability distribution for a start position $r_u(k=0)$ and a start velocity $v_u(k=0)$.

21. The method according to claim 4, wherein the state vector X(k) is determined by a recursively defined sequential Bayes filter.

22. The method according to claim 1, wherein the method further comprises predetermining, at the beginning of the process, for the position $r_u(k)$ and the velocity $v_u(k)$ of the receiver RX, a probability distribution for a start position $r_u(k=0)$ and a start velocity $v_u(k=0)$.

\* \* \* \* \*